United States Patent [19]
Wing

[11] Patent Number: 5,012,704
[45] Date of Patent: May 7, 1991

[54] BALL DRIVER FOR A THREADED COLLAR

[76] Inventor: George S. Wing, 531 Esplanade, Apt. 515, Redondo Beach, Calif. 90277

[21] Appl. No.: 369,256

[22] Filed: Jun. 21, 1989

Related U.S. Application Data

[60] Division of Ser. No. 219,077, Jul. 14, 1988, Pat. No. 4,858,299, which is a division of Ser. No. 122,493, Nov. 16, 1987, Pat. No. 4,784,549, which is a continuation of Ser. No. 702,811, Feb. 15, 1985, abandoned.

[51] Int. Cl.$^5$ .................................................. B25B 13/00
[52] U.S. Cl. ................................... 81/59.1; 81/124.6
[58] Field of Search ................... 81/59.1, 121.1, 124.3, 81/124.6, 176.15, 176.2, 177.85, 10, 53.2

[56] References Cited

U.S. PATENT DOCUMENTS

| | | | |
|---|---|---|---|
| 751,345 | 2/1904 | Saunders . | |
| 1,373,617 | 4/1921 | Johnson . | |
| 2,023,832 | 12/1935 | Fisher | 81/124.3 |
| 2,730,000 | 1/1956 | Crittenden | 87/59.1 |
| 3,763,725 | 10/1973 | Reiland | 81/124.6 |
| 3,798,749 | 3/1974 | Duer . | |
| 4,051,935 | 10/1977 | Nakayama | 81/59.1 X |
| 4,383,353 | 5/1983 | Stencel . | |
| 4,539,872 | 9/1985 | Bochman, Jr. . | |
| 4,649,727 | 3/1987 | Gray . | |
| 4,759,237 | 7/1988 | Fauchet et al. | 81/532 |

*Primary Examiner*—James G. Smith
*Attorney, Agent, or Firm*—Christie, Parker & Hale

[57] ABSTRACT

The driver is a wrenching socket having rotatable balls mounted in the wall of an axial bore. The balls are retained in the wall swaged material of the wall. The driver applies torque to a collar to be set in a joint by the balls acting on the walls of axial troughs of the collar. At a predetermined pre-load, the balls fail bark material of the collar between the troughs and plow through such material to develop circumferential furrows after which torquing ends.

2 Claims, 7 Drawing Sheets

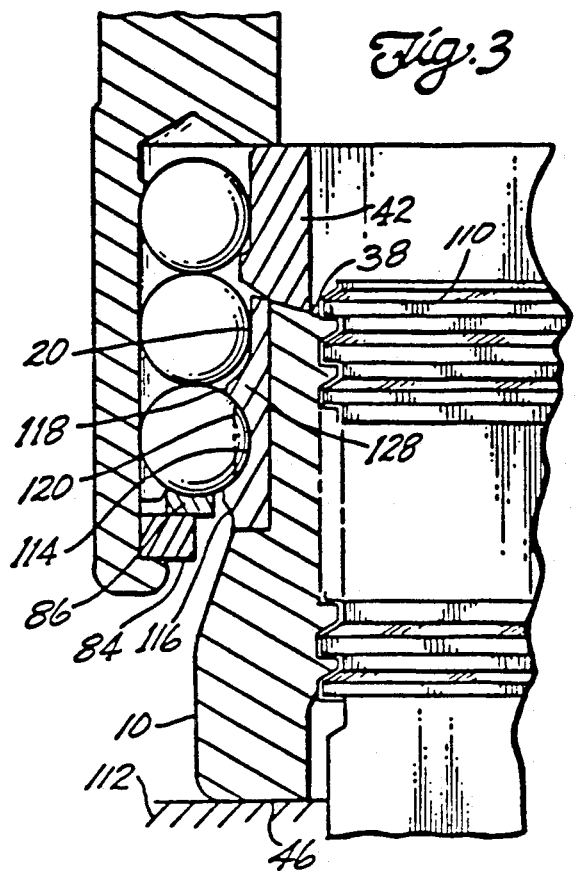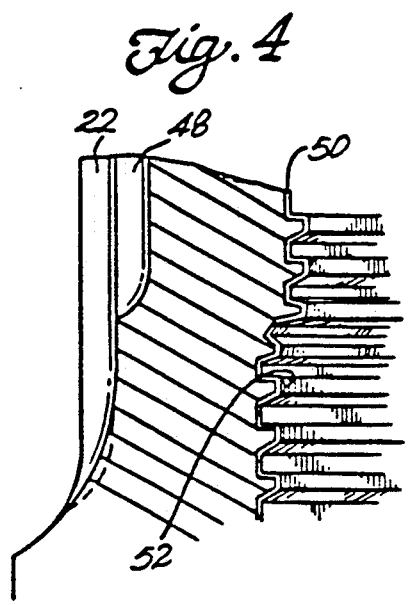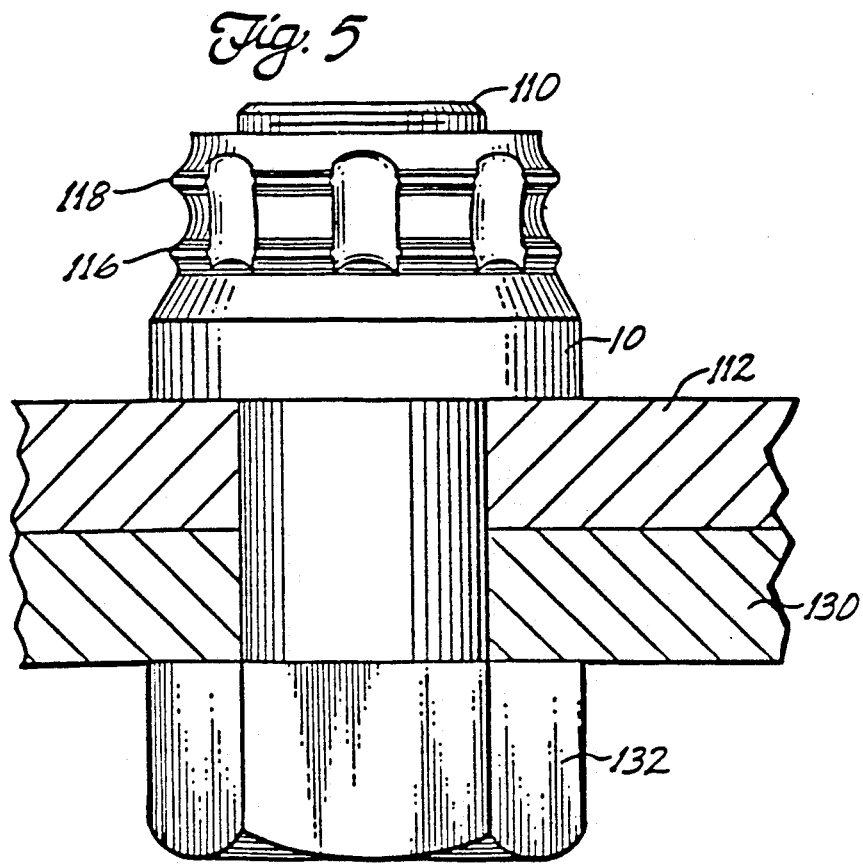

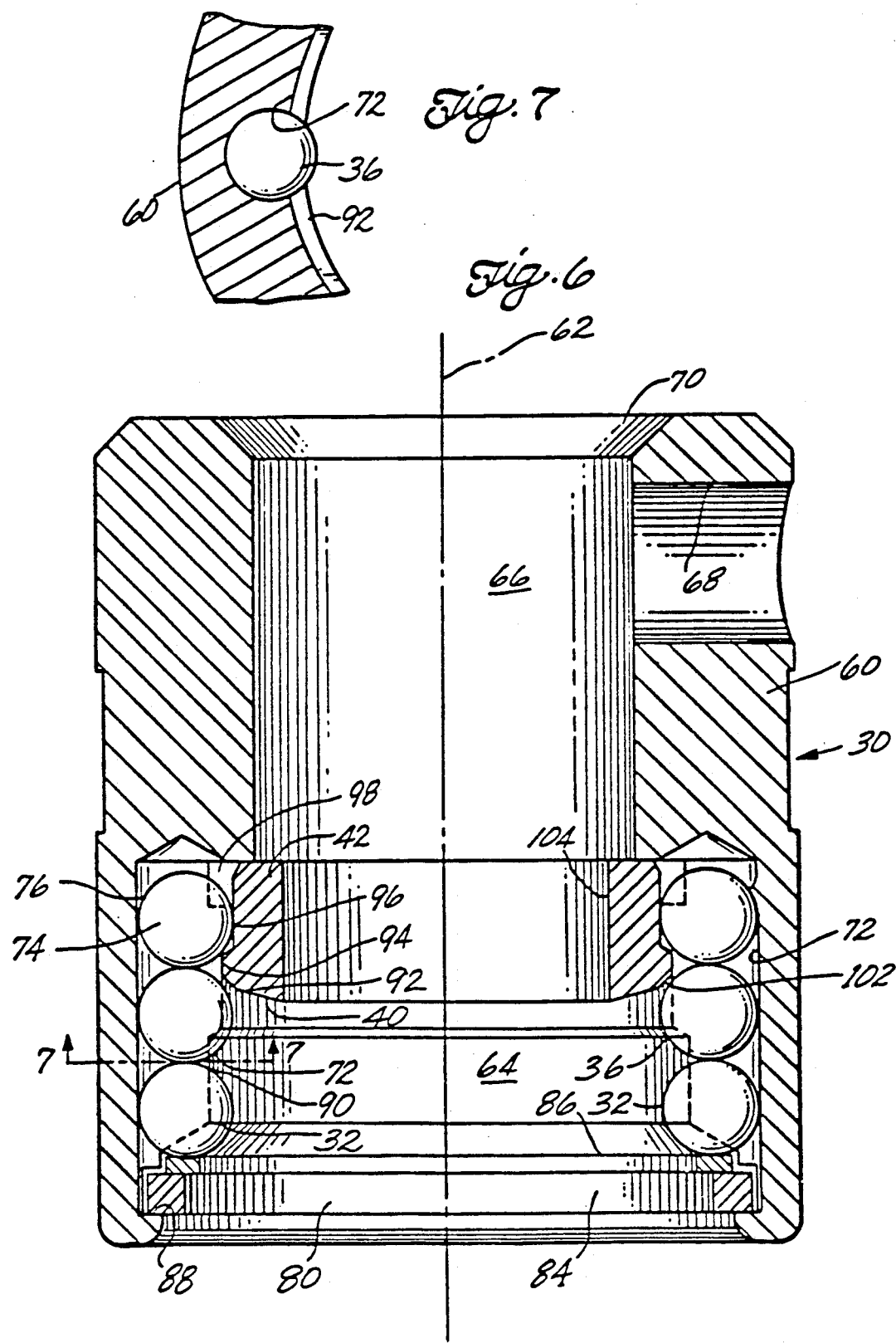

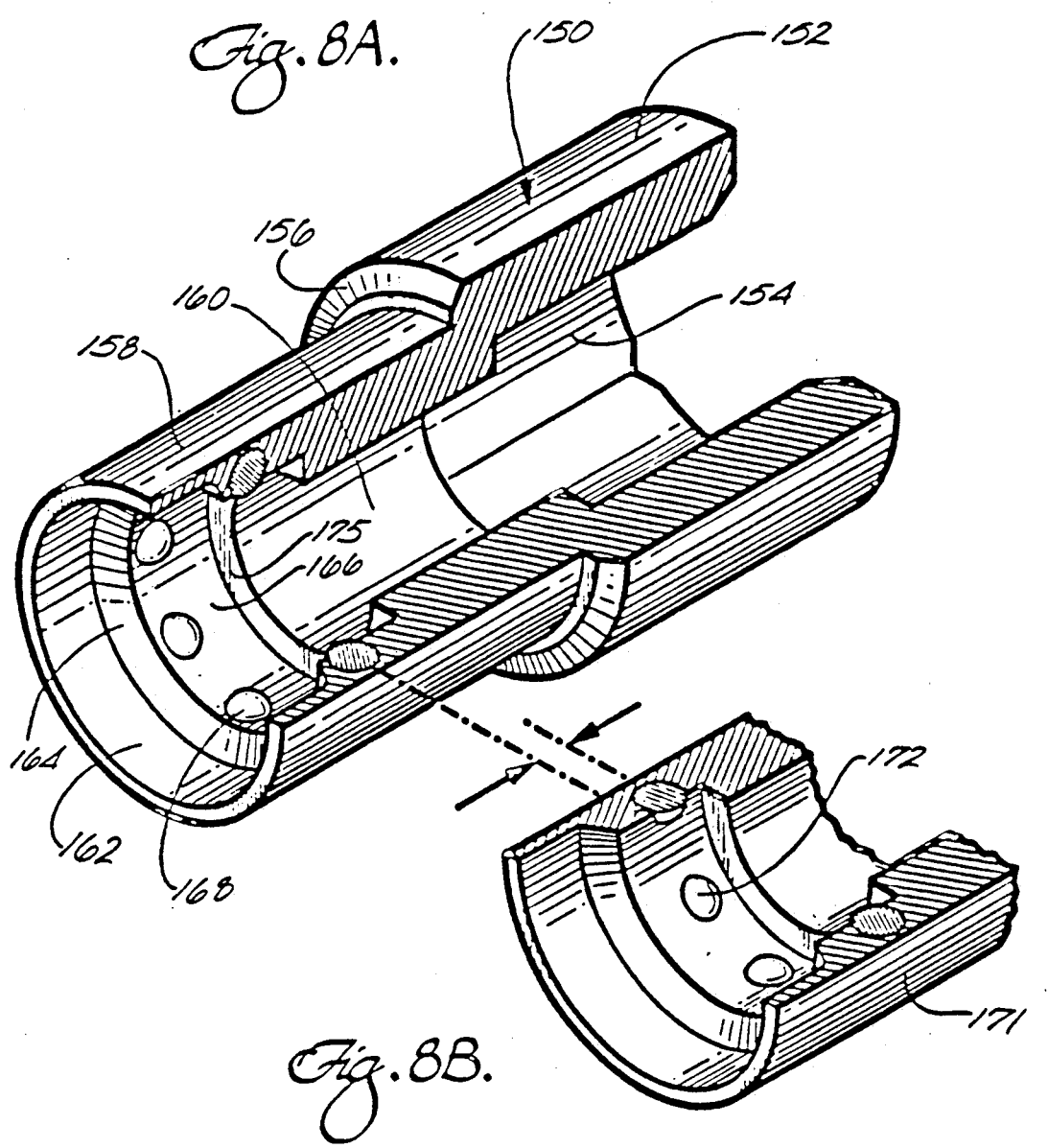

BALL DRIVER FOR A THREADED COLLAR

This application is a division of U.S. patent application Ser. No. 07/219,077, filed July 14, 1988, now U.S. Pat. No. 4,858,299, which is a division of U.S. patent application Ser. No. 07/122,493, filed Nov. 16, 1987, now U.S. Pat. No. 4,784,549, which is a continuation of U.S. patent application Ser. No. 06/702,811, filed Feb. 15, 1985, now abandoned.

BACKGROUND OF THE INVENTION

The present invention relates to fasteners in general, and, more in particular to fasteners of the torque-limiting type, a process of setting such a fastener, a resulting joint, and a driver used in the setting.

In a standard threaded fastener system of a male threaded fastener and a female threaded fastener, the female fastener has internal threads that thread onto external threads of the male fastener. Wrenching surfaces of both fasteners accept tools that tighten them and clamp one or more workpieces together between them, oftentimes with washers interposed in between. The combination of the fasteners and the workpieces are known as a "joint." Male threaded fasteners are variously known as "screws," "bolts," or "pins;" female threaded fasteners are variously known as "nuts" or "collars;" workpieces are sometimes called "sheets" or "structural elements."

Fasteners bear loads along their axes, tensile loads, and radially of their axes, shear loads. Tensile loading always exists because of the clamping force applied by the pin and the collar to the sheets; this load is known as "clamp-up" or "pre-load." When fasteners join two or more sheets and the sheets are loaded in their planes, one sheet may tend to slide over the other; when this loading of the sheets occurs, it is resisted by the fasteners, and the sheets load the fasteners in shear. Shear loads are transverse to the axes of the fasteners and transverse to the tension load. Cyclic loading of a fastener can produce fatigue failure. In aerospace applications shear failure is usually most critical in fatigue.

Adequate clamp-up or preload is absolutely necessary for a satisfactory joint. A fastener adequately loaded by the reaction to the clamp-up load resists fatigue failure. Preload also helps the structural elements to resist fatigue failure. Accordingly, it is desirable to know the clamp-up load the fastener applies to a structure to be sure that joint has adequate fatigue strength. Adequate clamp-up also avoids sheet slippage and fretting and insures against load shifting and joint failure.

Clamp-up load correlates to the resistance of a collar to further threading onto a pin and against a workpiece by the application of torque to the collar. As clamp-up force increases, to resistance to further threading increases, and the torque required to turn the collar increases.

This fact has been used in fasteners to develop a predetermined clamp-up load by termination of tightening through failure of a wrenching section on the collar. U. S. Pat. No. 2,940,495 to G. S. Wing and U. S. Pat. No. 4,260,005 to Edgar Stencel describe two types of such fasteners.

The Wing patent describes a collar extensively used in the aerospace industry. It has a wrenching section connected to an internally threaded section by a frangible break-neck collar. The collar breaks upon the application of a predetermined torque that corresponds to a desired clamp-up load. An acircular portion of the threaded section provides a thread lock by pressing tightly against the threads of the cooperating pin. A problem with this type of fastener is that it generates a waste piece: the wrenching section. The waste piece must be removed from the environment where the fastener is set. This type of fastener is also comparatively expensive because it requires a considerable amount of machining to make it and the frangible break-neck must be held to very close tolerances to provide close tolerances in break-off torques.

The Stencel patent describes a collar that has a plurality of circumferentially spaced lobes on its axial outside that serve as wrenching surfaces and in torque limitation. A wrenching tool, say a triangular shaped socket, has flats that engage flanks of the lobes and turn the collar with respect to the pin. Upon reaching a predetermined clamp-up load, the lobes fail in radial compression and merge into the body of the collar and, wrenching and tightening stops because the lobes no longer provide purchase for the setting tool. The Stencel collar produces a thread lock by a deformation of collar material radially inward of the lobes against the threads of a cooperating pin when the lobes fail.

Impact wrenches used in setting fasteners do so rapidly. The failures of the break-neck of the Wing fastener and of the lobes of the Stencel fastener occur over very few degrees of rotation, and, when an impact wrench is used, occur very rapidly. The rapid application of setting torques to a collar can result in loss of some desired pre-load through relaxation of the sheets; relaxation results from the continued deformation of the sheets after the initial loading. Such deformation reduces the load per unit area and absolute loading because material moves away from the clamped zone. When the break-neck or the lobes fail, they fail at a torque corresponding to a desired pre-load. But the loaded sheets can relax and some of the pre-load lost. This relaxation is a time-dependent phenomenon and with slower development of pre-load, relaxation and loss of pre-load will be less.

It may also be desireable to be able to change the pre-load even with the same collar. For example, when the sheets are not as strong in compression as some other sheets, it may be necessary to lower the compressive load on them.

In some applications secondary wrenching is desired in order to increase pre-load above design pre-load or to compensate for relaxation. Secondary wrenching is impossible in the standard configurations of the Wing and Stencel collars. These collars are also difficult to remove after they have been set because of the absence of wrenching sections.

An important requirement of an aerospace fastener is a known and repeatable clamp-up load. The clamp-up load correlates directly with the torque that sets the fastener. Nonetheless, a lot of the setting torque in a typical fastener system is not used in developing clamp-up, but instead is used in overcoming friction. The reduction of parasitic friction has the advantages of reducing the driving load, reducing the requirements of the setting tools, and increasing the accuracy of the clamp-up load.

In a fastener system where pre-load is determined by the failure of some external wrenching means, such as the lobes on the Stencel collar, swelling of the collar because of radial loads applied to it can adversely affect the pre-load.

Many fastener systems have a thread lock to keep the collars from loosening on the pins. A form of thread lock uses deformed thread of the collar to increase friction between the collar and the pin threads in a localized area. Substantial hoop stress on the collar imparted through the threads of the pin can reduce or eliminate the effect of the thread lock because the hoop stress overcomes the deformation in the collar and plastically deforms the thread lock so that it loses its ability to perform its function.

SUMMARY OF THE INVENTION

The present invention provides a new threaded collar, a method for its setting, a resulting joint, and a driver.

In general, the collar has a bark or plateau with at least one axially extending through that receives a driving element of a driver. A wall of the trough provides bearing for the driving element. As the collar tightens on threads of a pin and against the sheet of a joint, the pre-load increases and resistance to tightening increases. At a predetermined pre-load, the bark fails in circumferential compression and the driving element moves circumferentially with respect to the collar by plowing a furrow in the bark until its path is free of bark, whereupon resistance to wrenching stops. The collar also includes a base with a bearing surface for transmitting pre-load to one or more sheets.

In its presently preferred form, the collar includes a plurality of troughs in the bark spaced at regular circumferential intervals, each capable of receiving a ball driving element of the driver. A track on the collar pilots a guide of the driver during bark failure and helps align the collar and driver and axially position the driver. An interior chamfer at the top of the collar centers a thrust retainer of the driver during setting and applies an axial thrust on the collar at this time. An axial counterbore at the base end of the collar accommodates imperfect threads of the pin in a standard manner. The base of the collar has the greatest diameter of the collar. A transition section between the base and the bark reduces the diameter of the collar to the diameter of the bark. The troughs stop at the transition section. The troughs are arcuate in axial cross-sections. The track is at the entrance to the troughs at the top of the collar, the troughs extending slightly into the track. The track has an arcuate cross-section in axial section to pilot the guide of the driver. The collar can have a thread lock, preferably a crimp in the wall of the collar that deforms the threads to a limited axial and circumferential extent. The bark can be made of a different material from the rest of the collar so that its hardness is tailored to the pre-load desired. Alternatively, the threads of the collar can be in a hardened insert with the balance of the collar being comparatively soft. The troughs can be varied in number to vary the degrees of arc each driving element must travel during failure. Further, the number of driving elements can be increased by axially stacking them, one on top of the other, to develop two or more circumferential bands of troughs.

Preferably, the threads of the collar are modified buttress threads of the type described in my co-pending application, filed Feb. 15, 1985, Ser. No. 702,150, and entitled An Improved Thread Form and Fastener System Using The Form, and incorporated herein by reference. The buttress thread form experiences very little radial stress and, as a consequence, the collar does not expand. Because of its lack of expansion, the torque control setting load is very accurate, and the amount of parasitic torque is very low. Because of this, the accuracy of pre-load is very high.

The driver includes a body with a driving socket. This socket has driving elements, preferably balls, receivable in the troughs of the collar and engageable with the walls of the troughs to ultimately develop the furrows. Guide balls above the drive balls may be provided to guide on the track of the collar. Optionally, a thrust retainer in the socket can apply an axial thrust load on the collar during setting; it preferably has a positive taper for engaging a mating, negatively tapered chamfer of the collar. An acircular drive socket for accepting a corresponding element of a setting tool, such as an impact wrench, couples the driver to the tool for the application of torque to the collar. Preferably, the thrust retainer has a clear through bore for accepting the threaded end of a pin above the collar. The retainer may also have a radial, external flange that axially captures a sizing ball for each of the drillings of the driver which determines the diameter of the drillings.

For making a joint, the driver is placed on the collar with the driving balls in the troughs and the guide balls on the track. Torque applied on the driver threads the collar onto a threaded pin, and eventually the collar and pin will begin to load the sheets that they are joining in compression. When this load on the sheets reaches a predetermined pre-load, the bark fails and the driving balls begin to plow circumferential troughs through the bark, and when a complete circumferential band of troughs develop, torque application stops because the collar and the driver are no longer coupled for the transmission of torque to the collar.

As the balls plow through the bark, the pre-load already developed can relax somewhat. In this event, the resistance to tightening drops off and plowing stops in favor of further tightening of the collar on the pin. With further tightening, pre-load increases back up to the predetermined pre-load, then plowing begins again. There may be both plowing and rotation until pre-load stabilizes and rotation stops and only plowing occurs. The time it takes to plow a furrow is "dwell." The maximum dwell is the time it takes to plow a complete furrow entirely around the collar.

The number of troughs determines the amount of dwell. The fewer the troughs, the longer it will take for the bark to fail and the more likely it is that the ultimate pre-load in the joint will correspond to the pre-load at bark failure. For many applications, eight equally-spaced and axially-extending troughs will provide adequate pre-load after acceptable load relaxation. Dwell can also be increased by decreasing the number of driving balls, say for an eight trough collar, dropping the number of driving balls to four from eight doubles the dwell. However, because the bark area resisting failure is the dominant parameter in failure, it will be necessary to increase to approximately double the bark area failed by the balls to achieve the same pre-load when changing from an eight-ball to a four-ball drive.

Pre-load control can be achieved by varying the number of setting balls: a variation changes the area of bark resisting compressive failure; for example, reducing the ball count from eight to six reduces the pre-load by about 25% for the same collar.

It is presently preferred that pre-load control be effected by redriving the collar. A set of balls, say eight, occupy a ring at a first axial distance on a first driver.

These balls plow through the bark in the manner described. A second set of balls, say eight, occupying a different axial position in a second driver, then plows through the bark in a second axial position of the collar to bring the pre-load back up to the desired value after the pre-load relaxation attending the first drive.

The collar troughs are normally not completely obliterated by the setting action. For example, the depths of the furrows need not correspond to the depths of the troughs. Accordingly, secondary wrenching is possible with larger balls that extend deeper into the troughs than do the primary balls. Alternatively, secondary torquing can be accomplished by the driver having cylindrical rolls that gain purchase on unaffected portions of the bark. The collar can be removed by the same techniques.

The collar and driver develop a joint with a highly controlled pre-load and without developing a waste piece. The pre-load can be changed merely by changing the size of the driving element so that the furrow depth developed in the bark changes. Dwell time can be increased by reducing the number of driving balls so that each of the balls remaining has to plow through more bark, at least the bark between two troughs. A positive thread lock is always assured by the provision of the thread crimp.

These and other features and aspects and advantages of the present invention will become more apparent from the following description, appended claims and drawings.

Brief Description of the Drawings

FIG. 3 is a fragmentary view partly in half section of a collar and a driver with a furrow being formed;

FIG. 4 is a fragmentary view partly in half section showing the thread lock used with the collar of the invention;

FIG. 5 is a view of the collar in a set joint;

FIG. 6 is a view in elevational half section of a preferred form of the driver of the present invention;

FIG. 7 is a sectional view taken in the plane of 7—7 in FIG. 6;

FIG. 8A is a perspective view, partly in section, of the preferred driver of the present invention;

FIG. 8B is a perspective view, partly in section, of the preferred driver of the present invention with the driving balls at a different axial position than those of the driver of FIG. 8A for redriving;

Description of the Preferred Embodiments

Figure 2:
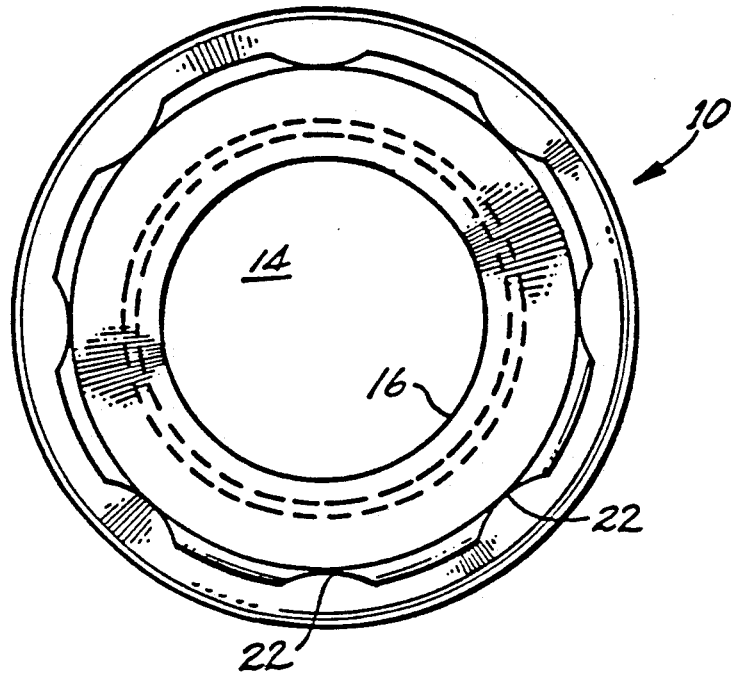
FIG. 2 is a top plan view of the collar of FIG. 1.
Figure 1:
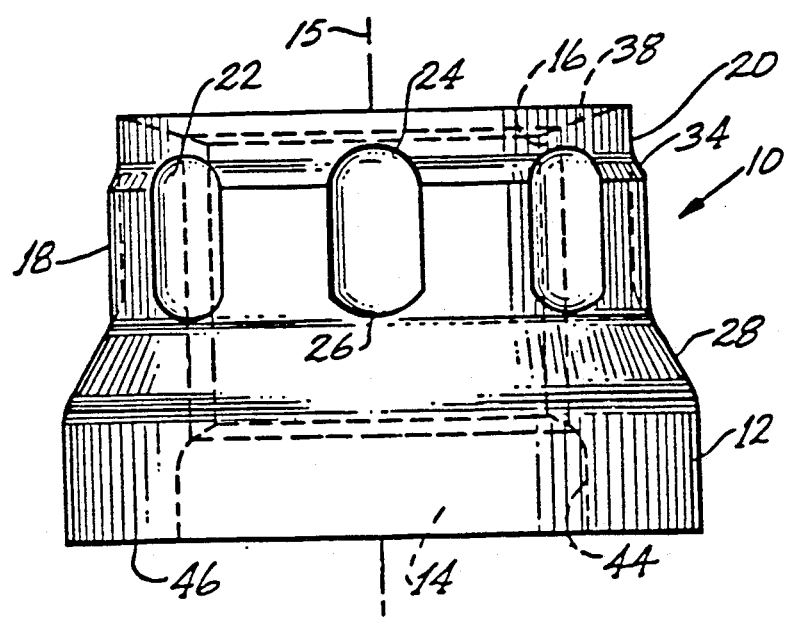
FIG. 1 is an elevational view of the preferred collar of the present invention.

FIGS. 1 and 2 show a presently preferred collar 10 of the present invention. In general the collar includes a base 12, an axial bore 14, an axis 15, a threaded section 16 of the axial bore, a wrenching section 18, and a track 20.

The wrenching section forms a bark or plateau of the collar. The bark is an axially extending skin of the collar along its outside. It has a plurality of axially-extending troughs 22 that extend in length from trough entrances 24 in the track to terminii 26 at a transition section 28 between the bark and base 12. Each trough has as a perimeter the arc of a circle that in the limit corresponds in diameter to the maximum diameter of drive balls of a driver, to be described in detail with reference to FIGS. 6, 8A and 8B and shown in FIG. 6 as driver 30 and balls 32. The depth of the trough, the material of the bark, and the diameter of the drive balls correlate so that bark fails upon the application of a predetermined compressive force in the circumferential direction on the bark. The failure in circumferential compression correlates directly with applied torque, which in turn correlates directly with the pre-load on a joint between the collar and the head of a cooperating pin on one or more sheets, as will be described in detail subsequently.

The bark can be integral with the collar, the collar being monolithic, or the bark can be a second member applied to the collar and secured there by a shrink fit. With such a composite construction the bark can be made of a soft material, for example, aluminum, and the collar can be made of a harder material, for example, A-286 stainless steel. The number of troughs of the preferred form of the invention is eight. The number of troughs can be varied.

The time it takes for a driving ball to traverse the distance between troughs, about 45°, and the rotational speed of the setting tool determine the extent of relaxation of a joint, all other parameters remaining constant. It may be that a greater separation of troughs would be desirable to minimize relaxation to a desired final pre-load. It is preferred to redrive the collar to minimize the effects of relaxation, and this will be described subsequently.

One way to control pre-load is by varying the amount of material the balls must plow through, and this can be done by varying the ball count. Pre-load is approximately a function of the number of balls: eight balls develop twice the pre-load that four balls do, all else being equal. Pre-load can also be varied by varying the area of the bark intercepted by the balls or the area of the balls intercepting the bark. A third way is to vary the hardness of the bark.

Track 20 is contiguous to and above bark 18. The lower portion of the track abutting the bark has a curved surface 34 with a radius in axial sectin corresponding to an arc of a circle having a diameter about equal to the diameter of guide ball 36 of the driver. The guide balls guide on track 20 and surface 34 to accurately maintain the axes of the driver and the collar coaxial during the threading of the collar onto the pin and during failure of the bark.

The collar also has an interior chamfered, annular seat 38 at the top of the collar. It has a negative taper of preferably about 150°. It seats a bearing surface 40 of a thrust retainer 42 of the driver. (See FIGS. 3 and 6.) This engagement permits the application of an axial thrust force on the collar during the threading of the collar onto the pin and the formation of a joint. The collar also has a base 12 of standard configuration. The base diameter is the largest on the collar to lower the unit loading on the sheets. It has a counterbore 44 that receives incomplete threads of the pin. It has a bearing surface 46 that extends radially from the axis of the collar and engages a washer or the surface of a sheet.

With reference to FIG. 4, the collar further includes a crimp thread lock. The thread lock is formed by crimp 48 at the floor of one of the troughs 22, the crimp deforms the wall of the collar above the zone where the driving balls act. The deformation deforms the threads locally at 50 by displacing them inward to form an acircular thread lock.

FIGS. 3 and 4 show the preferred form of the threads of the collar of this invention: a modified buttress thread 52. The thread has a load-bearing flank that is nearly perpendicular to the axis of the collar and a nonload-bearing flank that is at an angle of about 45 degrees to the perpendicular to the axis of the collar. The thread form has a substantial right cylindrical, axially-extending root and a right cylindrical flat at its crest. This buttress thread form produces very little radial force on the collar. As a consequence, the collar can be made light weight because the diameter of the bark will not change during setting. It has been found that without the buttress thread, and using a standard V-shaped thread, some collars expand radially under the radial stress imposed by the pin, and this expansion presents more material for the balls of the driver to go through, increasing the torque required to set the collar, and, with this increase in torque, the radial stress increases even further. This increase in dimension makes control of the amount of clamp-up force hard. The buttress thread avoids the problem, and clamp-up load can be accurately correlated to the balls plowing through the bark.

FIG. 6 shows driver 30. The driver has a body 60. The body has an axis 62. An axial bore 64 extends completely through the body and has several sections. The first of these sections is a socket 66 that may be square in cross-section and receives a drive of a wrenching tool. A detent 68 opens into the socket to receive a ball of the drive. A conical chamfer 70 pilots the wrenching tool drive into socket 66 and tapers away from the socket. So much is standard.

The drive end of the socket includes drive balls 32 and pilot balls 36. These balls are kept in axial drillings 72. A sizing ball 74 sizes the drillings accurately for both the pilot and drive balls. Material displaced by the ball can be seen in front of the ball. As can be seen in FIG. 7, the drillings extend beyond the center of the balls and wrap around the balls to radially capture them.

A keeper assembly 80 provides the constraint for balls in the opposite direction. The keeper assembly includes a pair of rings 84 and 86. Ring 84 is received in a circumferential groove 88 of the body 60. Ring 86 is stacked on top of ring 84 and provides the actual bearing on the driving balls. Ring 84 is split to get into groove 88. Ring 86 is continuous and is kept in place by ring 84.

Bore 64 steps down from groove 88 at 90 to provide the capture for balls 32 but it is larger than the diameter on the outside of the collar. The bore steps down again at 92 to provide a radial stop for an external radial flange 94 of retainer 42 as well as the capture of guide ball 36. Bore 64 steps down again at 96 to provide a radial stop for external flange 94 of retainer 42 to bear against and to locate the retainer axially in the balance of the driver.

Driver 30 also has a plurality of radial fingers 98 that extend into corresponding slots through the walls of the drillings in order to keep the retainer from rotating by bearing against walls of the body.

As already mentioned, the retainer has external radial flange 94 that engages the bearing surface of internal stop 96 of the body. It also has a clearance taper 102 to clear guide balls 92. Taper 102 bounds bearing surface 40.

The retainer has an axial cylindrical bore 104 to receive the threaded end of a pin.

FIG. 3 shows the mechanism of bark failure and the determination of the predetermined torque. In the figure, the illustrated portion of the driver is rotating into the paper to set collar 10 on a cooperating threaded pin 110. Bearing surface 46 of the collar bears against a surface of a sheet 112 for the transfer of an axial compressive pre-load to the sheets in cooperation with a head of pin 110. The driving ball has plowed a furrow 114 in the bark. The furrow takes the cross-section of the ball and develops radial protruding ring sectors 116 and 118 from material displaced from the trough. Vertical line 120 shows the depth of the furrow plowed into the bark below the raised ring sectors. Plowing continues until all the balls plow out a complete circumferential furrow. In the embodiment illustrated, ball travel will be about 45°. (It is not 45° because of the width of the troughs.) During this relative rotation between the driver and the collar, the guide balls will track on track 20 and maintain a fixed vertical and angular orientation of the driver with respect to the collar. During this rotation and before it, thrust retainer 42 bears on seat 38 and applies an axial thrust to the collar to force it axially along the threads of pin 110.

The resulting joint has a predetermined pre-load that is very close to the load on the sheet that existed during the plowing of the furrows in the bark; there is very little relaxation. There is very little relaxation because relaxation is a function of time, the shorter the time for the set, the more relaxation there will be. Because of the time required to traverse the approximately 45° between troughs, there is plenty of time for relaxation during the set, and therefore the achievement of a pre-load corresponding to the pre-load on the joint at failure.

Stated differently, the load applied to the sheets during plowing must spread from a comparatively local zone to a comparatively larger zone. During the first portion of plowing, the pre-load reduces due to relaxation and if it reduces enough, the collar will rotate on the threads a little to increase the pre-load. Plowing and tightening can occur simultaneously, but eventually only plowing occurs after the pre-load stabilizes at its final value.

Pre-load depends on a few factors. One is the bark area intercepted by the ball, which can be varied by varying the thickness of the bark, the depth of the trough, or the diameter of the ball.

The pre-load also depends upon the hardness of the collar and its material. Obviously, the pre-load increases as a function of hardness. If the collar material is work-hardenable, the resistance to plowing increases for a few degrees of arc because of workhardening before reaching substantially a constant value. The development of the ring sectors, as well, influence pre-load by the development of a "bow wave" of collar material ahead of the plow that effectively increases the area of the bark that resists plowing.

Note that with the driver construction of the invention, varying the pre-load by varying the diameter of the ball is easy and effective: the retaining ring set is removed and the drive ball changed, the axial location of the drive ball can be fixed by varying the thickness of ring 86 with the diameter of the drive ball used so that the total of both is always a constant. When the drive balls are smaller in diameter than is necessary to span the gap between the bottom of the trough and the wall of the driver radially of the bottom, the balls ride up on the trough wall and contact the driver wall during plowing because this is the location of least resistance.

FIG. 3 also shows a composite nut and collar construction a separate piece of bark 128 replaces bark 18.

FIG. 5 shows the completed joint. Collar 10 and a head 132 of pin 110 tightly clamp sheets 112 and 134 between them with a predetermined pre-load. The arc sectors of the developed ridges 116 and 118 extend completely around the collar. The trough depth extends deeper than the furrow depth because the diameter of the driving balls was smaller than the distance between the bottom of the troughs and the constraining driver wall radially outward from the trough. This leaves a portion of the trough for secondary wrenching to tighten the joint to effect greater pre-loads than on the primary setting or to breakdown the joint by the removal of the collar and pin. Secondary wrenching can be done with cylindrical drivers in place of driving balls 32.

FIGS. 8A and 8B illustrate the presently preferred drivers of the invention. The Figures show two wrenching sockets, each having balls in a different axial position from the other. In FIG. 8A, a socket 150 has a barrel 152 with a standard four-sided wrenching socket 154. The driver narrows at a transition section 156 to a driving end 158. An axial bore 160 of the driver extends through it and into the wrenching socket. The axial bore includes an enlarged diameter guiding section 162 that guides around the base of the collar. The guiding section ends and the bore steps down at a shoulder 164. A right cylindrical ball retaining section 166 extends from the shoulder toward the socket end of the driver. A plurality of regularly spaced balls 168 in this retaining section are the driving balls of the driver and plow a furrow in the back of a collar at a predetermined axial position of the collar. The balls are retained in place by swaging of the material of the retaining section. The driving section ends at an interior shoulder 170 that pilots on the top of the collar to axially locate the balls with respect to the collar. In FIG. 8B, a second driver 171 shows driving balls 172 at an axial location spaced from the axial location of the balls of the first driver by the distance between the two arrows between FIGS. 8A and 8B. The balls of the second driver develop a second furrow in the collar during a redrive step that compensates for the relaxation and occurs after the first drive and assures that the joint formed by the collar has the desired pre-load. Other than the ball location, the driver of FIG. 8B is identical to the driver of FIG. 8A.

Figure 9:
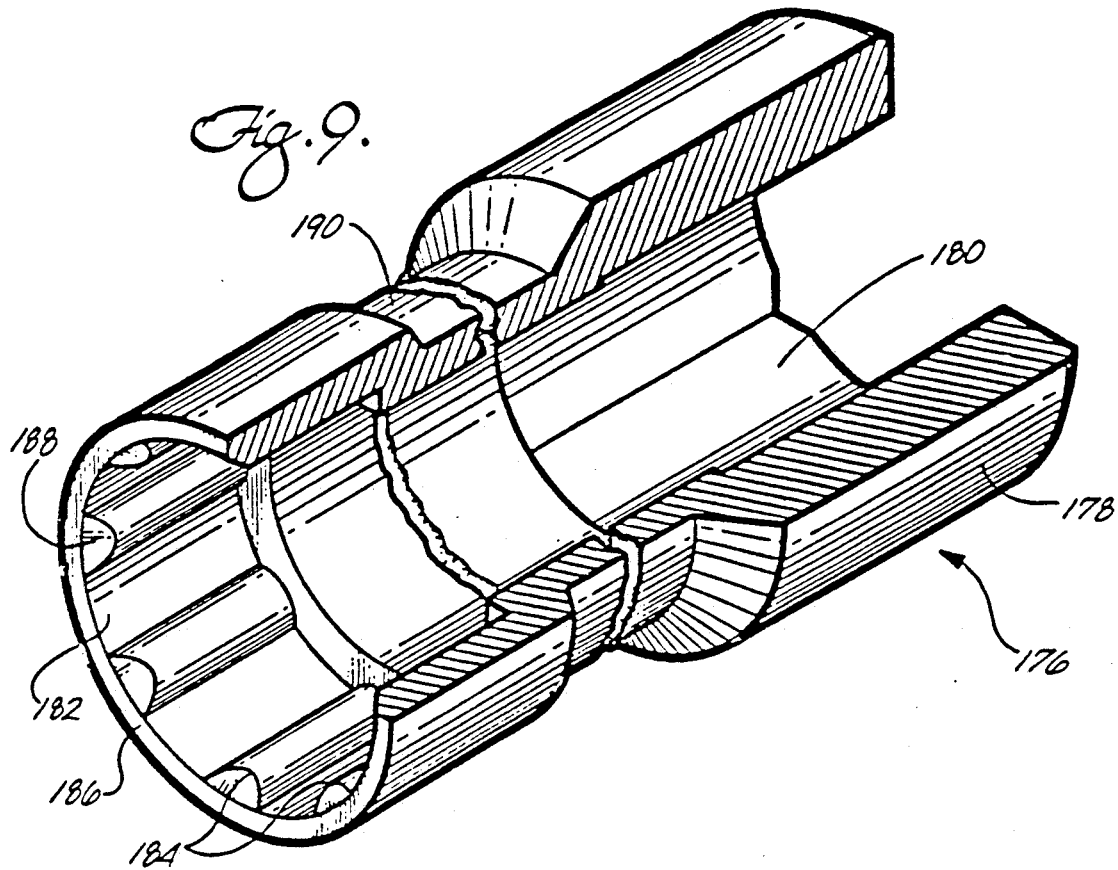
FIG. 9 is a perspective view, partly in section, of the preferred removal tool of the present invention.

FIG. 9 shows a third tool used with the collar of this invention to remove the collar from a pin. A removal tool 176 includes a barrel 178 that has a standard, four-sided drive socket 180 at one end. At the opposite end, a removal socket 182 has eight axially-extending removal lobes 184 that register in the troughs of the collar and gain purchase on the sides of the trough on the collar's bark, particularly between furrows, during the removal of the collar from a pin. A chamfer 186 at this end of the removal tool pilots the tool onto the collar, and a bevel 188 at the end of each of the lobes serves the same function in piloting the lobes into the troughs. The ends of the removal tool connect through a neck 190.

Figure 10A:
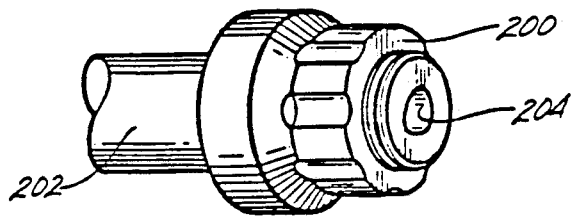
FIGS. 10A through 10C illustrate the driving of the fastener of the present invention with the preferred driver.
Figure 10B:
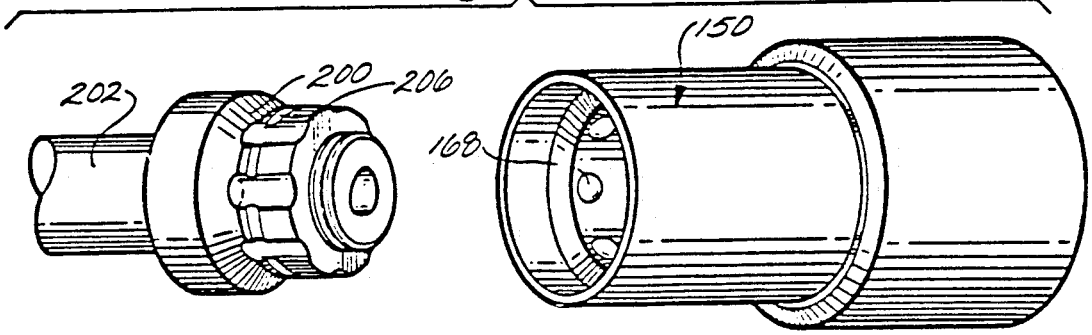
Figure 10C:
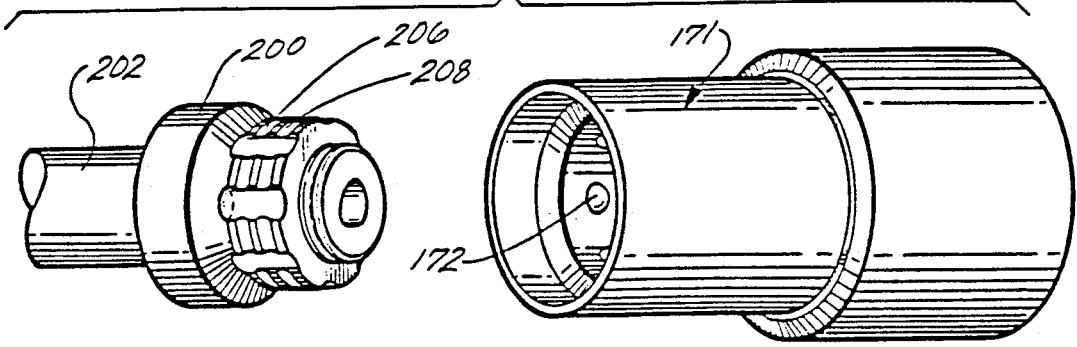

FIGS. 10A through 10C show a driving sequence of the collar and driver of the present invention. A collar 200 on a pin 202 bears on a workpiece, not shown. The pin is restrained from rotating during driving through a wrench in a socket 204. In FIG. 10B, the first furrows 206 have been formed by balls 168 of socket 150. The resulting joint has a predetermined pre-load at setting, but that load relaxes to a value lower than desired. This relaxation is taken up on a redrive shown in FIG. 10C. There, driver 171 has formed a second set of furrows 208 axially spaced from the first set. The resistance to failure of bark material confronting the balls of driver 171 is the same as bark material confronting the balls of driver 150. As a consequence, the joint after redrive will have the predetermined pre-load desired, relaxation after the redrive not accounting for any material deviation from this value.

Figure 11:
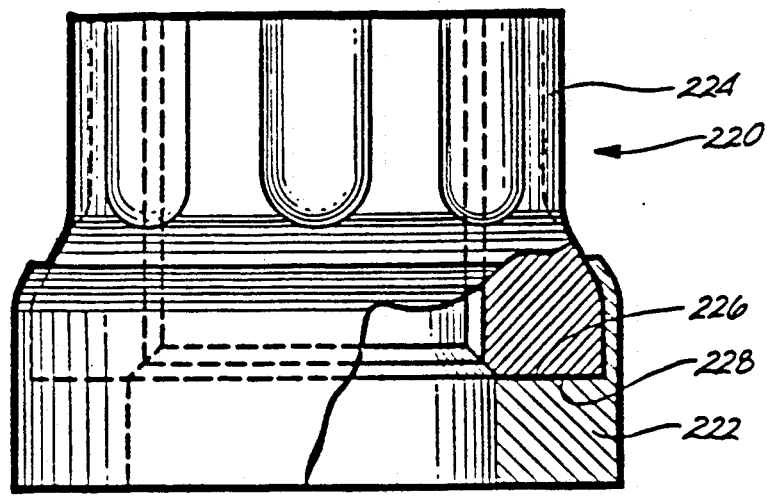
FIG. 11 is an elevational view, partly in half-section, of an alternate embodiment of the collar of the present invention.

FIG. 11 shows an alternate embodiment 220 of the collar of the present invention. It is of a composite construction of two parts, a base washer 222 and a nut 224, The nut is the driving and threaded portion the collar. Washer 220 is capable of rotating on nut 224 so that the base remains stationary during the installation of the collar, not introducing a variable into setting torque or moving the workpiece surface. The nut and collar engage at radial surfaces 226 and 228. The frictional engagement between these engaging surfaces can be closely controlled. A lubricant between the two surfaces can reduce the friction and this parasitic torque. Other than in the composite construction, the collar shown in FIG. 11 is the same as in the previously-described embodiments.

Figure 12:
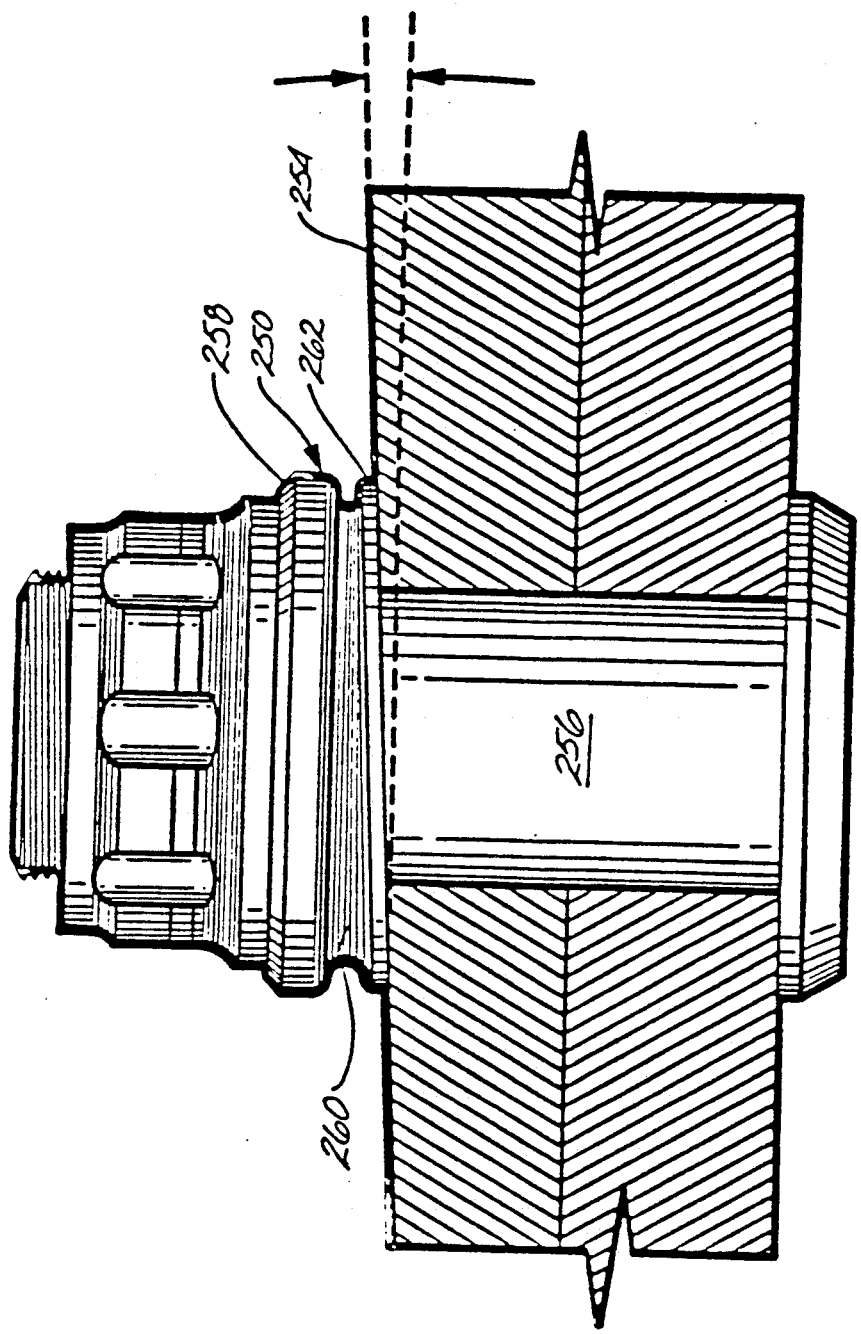
FIG. 12 is a view of the fastener system of the present invention with a washer that deforms to compensate for a difference in the angle of the sheets from a perpendicular to the hole through the sheets.

FIG. 12 shows the collar of the present invention with a washer 250 affixed to it at its base. This washer is capable of deforming under axial load to accommodate an inclination of the adjacent workpiece surface from a perpendicular to the axis of the collar and pin. In the Figure, workpiece 252 has a surface 254 at an angle to the perpendicular to the axis of the fastener and the hole in which a pin 256 extends, the angle of inclination being indicated by the opposed arrow heads to the right in the Figure. Washer 250 is retained on the collar through a crimped section 258. The washer necks in at 260 in a weak section, weak in compression or column relative to the balance of the washer. A bearing end 262 of the washer connects to this weakened section and bears directly on the workpiece. The weakened section fails in column with the application of sufficient axial load and exactly compensates for the angle of the surface of the workpiece from the perpendicular to the axis of the fastener and the hole through the workpieces. As in the previously-described embodiment, the washer can rotate with respect to the collar so that the setting torque is not affected by the condition of the workpiece surface engaged by the washer.

The present invention has been described with reference to certain preferred embodiments. The spirit and scope of the appended claims should not, however, necessarily be limited to this description.

What is claimed is:

1. A driver for setting a collar in a joint by application of torque to the collar, the collar, the collar having a plurality of axially extending troughs and circumferentially extending bark means between the troughs, the driver comprising:

(a) means for accepting a torque from a torque applying tool;
(b) an annular driving section having a right cylindrical axial bore, the axial bore opening at one end of the driver; and
(c) a plurality of balls mounted in the driving section at equal angular intervals, the balls being mounted in the driving section at least substantially by swaging of driving section material around the balls such that the swaged material captures the balls and prevents them from coming out of their mountings while permitting the balls to rotate in their mounting, the mounting also being such that the balls extend inwardly towards the axis of the driver for engaging the walls of the trough in the collar to apply a torque to the collar and failing the bark of the collar circumferentially adjacent the troughs to develop circumferential furrows between the troughs upon reaching a predetermined pre-load in the joint.

2. The driver claimed in claim 1 including an annular, radial surface at the end of axial bore in the driver section opposite the opening, the radial surface extending radially inward from the wall of the axial bore in the driving section for bearing on a free end of the collar and axially locating the driver on the collar.

* * * * *